United States Patent
Guo et al.

(10) Patent No.: US 8,734,728 B2
(45) Date of Patent: May 27, 2014

(54) NH3 OXIDIZER GAS DISTRIBUTOR

(75) Inventors: Jing Guo, Moseley, VA (US); Matthew Warren, Richmond, VA (US)

(73) Assignee: Honeywell International Inc., Morristown, NJ (US)

( * ) Notice: Subject to any disclaimer, the term of this patent is extended or adjusted under 35 U.S.C. 154(b) by 107 days.

(21) Appl. No.: 13/164,194

(22) Filed: Jun. 20, 2011

(65) Prior Publication Data

US 2012/0321529 A1    Dec. 20, 2012

(51) Int. Cl.
| | |
|---|---|
| *B01J 8/02* | (2006.01) |
| *B01J 35/02* | (2006.01) |
| *B01J 19/00* | (2006.01) |
| *B01J 19/30* | (2006.01) |
| *B01J 19/32* | (2006.01) |
| *B01J 8/00* | (2006.01) |
| *C01B 21/00* | (2006.01) |
| *C01B 21/22* | (2006.01) |
| *C01B 21/24* | (2006.01) |
| *C01B 21/26* | (2006.01) |

(52) U.S. Cl.
USPC ........... 422/220; 422/129; 422/187; 422/211; 422/310; 422/311; 423/351; 423/385; 423/400; 423/402

(58) Field of Classification Search
USPC ................. 422/129, 187, 211, 220, 310, 311; 423/351, 385, 400, 402, 403; 141/285–286; 261/99–102, 105
See application file for complete search history.

(56) References Cited

U.S. PATENT DOCUMENTS

| | | | |
|---|---|---|---|
| 3,880,300 A | 4/1975 | Uhl | |
| 4,471,821 A | 9/1984 | Coulon et al. | |
| 4,759,884 A * | 7/1988 | Michimae et al. | 261/113 |
| 6,878,351 B1 | 4/2005 | Davies | |
| 7,258,144 B2 | 8/2007 | Barthod et al. | |
| 7,316,733 B1 * | 1/2008 | Hedrick et al. | 95/269 |
| 7,323,152 B2 * | 1/2008 | Axon et al. | 423/240 R |
| 7,357,337 B2 * | 4/2008 | Ferrari | 239/428.5 |
| 7,449,157 B2 * | 11/2008 | Kanno et al. | 422/176 |
| 2003/0133849 A1 | 7/2003 | Schumacher et al. | |
| 2005/0255009 A1 | 11/2005 | Davis et al. | |
| 2008/0160464 A1 | 7/2008 | Ghani et al. | |
| 2009/0118443 A1 | 5/2009 | Stavens et al. | |
| 2009/0297417 A1 | 12/2009 | Sun et al. | |
| 2010/0152515 A1 | 6/2010 | Palmas et al. | |
| 2011/0011060 A1 | 1/2011 | McCarthy, Jr. | |

FOREIGN PATENT DOCUMENTS

| | | |
|---|---|---|
| JP | 2000262857 A2 | 9/2000 |
| JP | 2004-190961 A | 7/2004 |
| WO | 98/57887 A1 | 12/1998 |

OTHER PUBLICATIONS

Zhang Guangyu et al., "Study on the Performance of a Gas Stream Distributor in a Shallow Fixed-Bed Reactor," Chemical Reaction Engineering and Technology, No. 3, vol. 3, Sep. 1987, pp. 1-10.
Mahesh T. Dhotre et al., "CFD Simulation of Gas Chamber for Gas Distributor Design," The Canadian Journal of Chemical Engineering, vol. 81, Jun.-Aug. 2003, pp. 677-683.
International Search Report issued in PCT/US2012/042870, mailed Feb. 26, 2013, 4 pages.

* cited by examiner

*Primary Examiner* — Natasha Young
(74) *Attorney, Agent, or Firm* — Faegre Baker Daniels LLP

(57) ABSTRACT

Ammonia oxidizers are disclosed that can include gas distributors and distribution rings to improve the distribution of the flow of a gas feedstream across a catalyst bed in the ammonia oxidizer. The gas distributors include circular plates that have holes through which the gas feedstream is distributed across the catalyst bed. In some examples, the gas distributors also have a sidewall. The distribution rings are attached to the inner wall of the ammonia oxidizer at a predetermined distance below the gas distributor.

20 Claims, 3 Drawing Sheets

NH3 OXIDIZER GAS DISTRIBUTOR

FIELD OF THE INVENTION

The present technology relates to ammonia ($NH_3$) oxidizers, and specifically to gas distributors for an ammonia ($NH_3$) oxidizers.

DESCRIPTION OF RELATED ART

Hydroxylamine sulfate can be used in caprolactam production. Caprolactum is an organic compound having the formula $(CH_2)_5C(O)NH$, and is widely used as a raw material in making Nylon-6. Hydroxylamine sulfate production can be carried out in a number of parallel trains consisting, for example, of the following operations: ammonium carbonate production, ammonium nitrite production, ammonium hydroxide production, hydroxylamine disulfonate production, and hydrolysis.

The ammonium nitrite production processes can include of a series of steps that begins with burning, or oxidizing, of ammonia in the presence of air. The oxidization of ammonia can occur across a cobalt catalyst bed contained within a vessel referred to as an ammonia ($NH_3$) oxidizer. The catalyst bed tends to be shallow, having a depth of only a few inches, due to the kinetics of the ammonia oxidation reaction.

SUMMARY OF THE INVENTION

The present technology relates to gas distributors for ammonia ($NH_3$) oxidizers.

In one aspect, an ammonia oxidizer is provided that includes a vessel having an inner wall, a catalyst bed contained within the vessel, a gas inlet in the vessel, and a gas distributor installed in a gas inlet. The ammonia oxidizer can also include a distribution ring attached to the inner wall of the vessel at a predetermined location below the gas distributor, the distribution ring having a width.

In another aspect, ammonia oxidizer is provided that includes a vessel having an inner wall and a gas inlet, a catalyst bed contained within the vessel, a gas inlet in the vessel, a gas distributor installed in the gas inlet, and a distribution ring attached to the inner wall of the vessel at a predetermined location below the gas distributor, the distribution ring having a width. The gas distributor can comprise a circular gas diffuser plate having a thickness and a center point, and a plurality of holes arranged in a series of concentric rings, each ring having a center at the center point of the gas diffuser plate.

In further aspect, an ammonia oxidizer is provided that includes a vessel having an inner wall and a gas inlet, a catalyst bed contained within the vessel, a gas inlet in the vessel, and a gas distributor installed in the gas inlet. The gas distributor can include a circular gas diffuser plate having a thickness and a center point, a plurality of holes arranged in a series of concentric rings, each ring having a center at the center point of the gas diffuser plate, and a gas distributor sidewall connected to the gas diffuser plate at a lower end of the gas distributor sidewall and connected to the gas inlet of the vessel at an upper end of the gas distributor sidewall.

BRIEF DESCRIPTION OF THE DRAWINGS

Specific examples have been chosen for purposes of illustration and description, and are shown in the accompanying drawings, forming a part of the specification.

DETAILED DESCRIPTION

Figure 1:
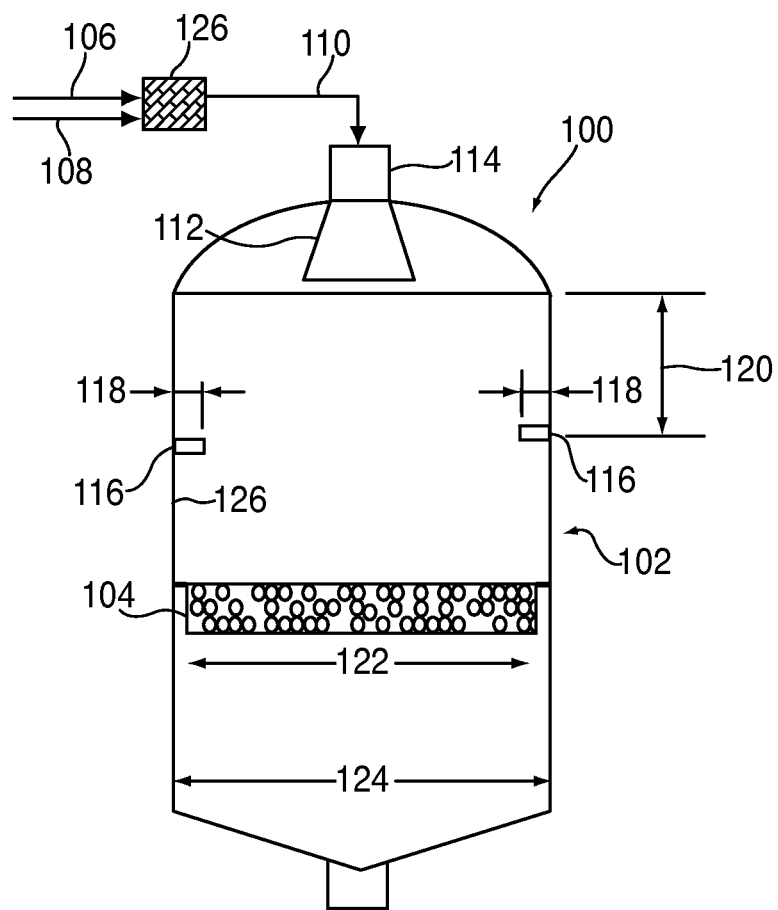
FIG. 1 is a cross-section of one example of an ammonia oxidizer having a generally cylindrical vessel.

FIG. 1 illustrates an ammonia ($NH_3$) oxidizer 100 that can be used in processes of hydroxylamine sulfate production. The ammonia oxidizer 100 includes a vessel 102, and catalyst bed 104 contained within the vessel 102. The catalyst contained in the catalyst bed 104 can be a cobalt catalyst, and the catalyst bed 104 can be shallow. For example, the cobalt catalyst bed 104 can have a diameter 122, which can be smaller than the diameter 124 of the vessel 102. In an example where the catalyst bed has a diameter of about 9 feet, the catalyst bed 104 can have a depth that is from about 3 inches to about 5 inches. In such an example, the diameter 124 of the vessel may be about 120 inches.

Ammonia oxidation can include providing an ammonia gas feed stream 106, which can be combined with an air feed stream 108 in a mixer 126, such as a static mixer, to form gas mixture feed stream 110. The ammonia in the ammonia gas feed stream 106 can be combined with the air feed stream 108 in any suitable ratio to form the gas mixture feed stream 110, such as for example at about a 10% mole ratio of ammonia to air. The gas mixture feed stream 110 can be introduced into the ammonia oxidizer 100 through a gas distributor 112 installed in a gas inlet 114 in the vessel 102 of the of the ammonia oxidizer 100.

At higher flow rates, the gas mixture feed stream 110 can tend to cause catalyst in the catalyst bed 104 to shift, which may result in bare spots and allow unreacted ammonia to pass through the catalyst bed 104. Efficient distribution of the gas mixture feed stream 110 across the cobalt catalyst bed 104 can reduce shifting of the catalyst in the catalyst bed 104. For example, current catalyst conversion in ammonia oxidation processes can be about 96% to about 98%, with the average ammonia consumption for a single ammonia oxidizer being about 4,500 lbs/hr. Improving the distribution of the gas mixture feed stream 110 across the cobalt catalyst bed 104 can result in an improvement of catalyst conversion. A catalyst conversion improvement of 1% would result in an ammonia consumption decrease of 45 lbs/hr.

In the example illustrated in FIG. 1, the ammonia oxidizer 100 also includes a distribution ring 116. Although, it should be understood that including a distribution ring 116 in an ammonia oxidizer 100 is optional in at least some examples. The distribution ring 116 can alter the distribution of the gas mixture feed stream 110 by redirecting gas flow from the wall of the vessel 102 back towards the catalyst bed 104. As shown in FIG. 1, distribution ring 116 can be attached to an inner wall 126 of the vessel 102, which can extend circumferentially around the inner wall 126 of the vessel 102. The distribution ring 116 has a width 118 that extends from the inner wall 126 towards the interior of the vessel 102, and can be located a predetermined distance 120 below the gas distributor 112. In some examples where the vessel has a diameter of up to about 15 feet, such as about 10 feet, the distribution ring 116 can have a width of up to about 5 inches, including from about 1 inch to about 4 inches, or from about 1.5 inches to about 3 inches. In such examples, the predetermined distance 120 below the gas distributor 112 at which the distribution ring 116 is located can be from about 30 inches to about 50 inches, or from about 42 inches to about 47 inches.

Figure 2:
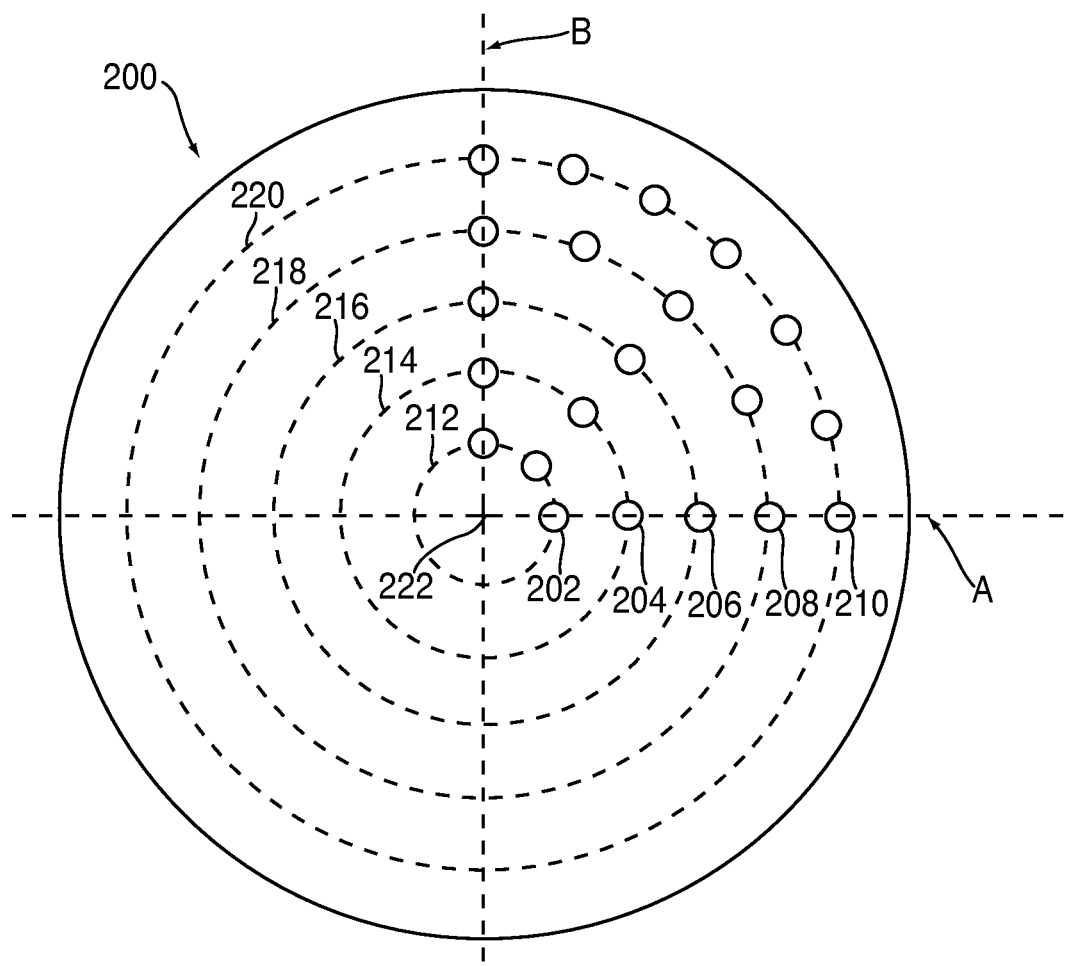
FIG. 2 is a top view of one example of a gas distributor of the present technology.

A gas distributor 112 can comprise, or consist of a circular gas diffuser plate. One example of a circular gas diffuser plate is illustrated in FIG. 2. FIG. 2 is a top view of gas diffuser plate 200, showing a plurality of holes 202, 204, 206, 208, and 210 arranged in a series of concentric rings 212, 214, 216, 218, and 220, the center of each ring being the center point 222 of the gas diffuser plate 200. Although the arrangement of holes 202, 204, 206, 208, and 210 is shown for only one quadrant, the arrangement of the holes can be symmetrical with respect to both the horizontal reference line A and the vertical reference line B. Thus, in the example illustrated in FIG. 2, the gas diffuser plate 200 includes a first ring 212 having eight holes 202, a second ring 214 having eight holes 204, a third ring 216 having 8 holes 206, a fourth ring 218 having 16 holes 208, and a fifth ring 220 having 24 holes 210. The angle between each hole on a given ring can be determined by dividing the 360° of the ring by the number of holes in the ring.

Figure 3:
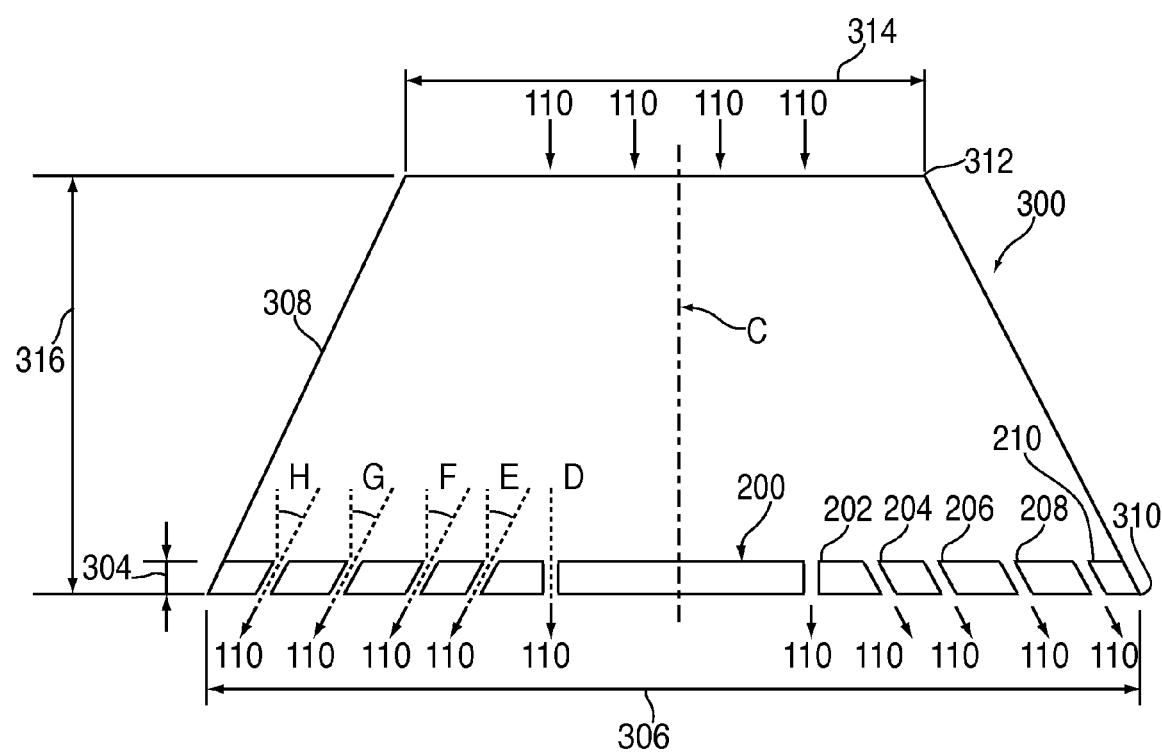
FIG. 3 is a cross-sectional view of a second example of a gas distributor of the present technology.

With reference to FIG. 1 through 3, the gas mixture feed stream 110 passes into the interior of the vessel 102 and across the catalyst bed 104 through the holes 202, 204, 206, 208, and 210 of the gas diffuser plate 200. As illustrated in FIGS. 2 and 3, the holes 218, 220, 222, 224, and 226 extend through the gas diffuser plate 200, and can be arranged in a pattern, such as in a series of rings, configured to provide a desired distribution of the gas mixture feed stream 110 in the vessel.

The arrangement of the holes 202, 204, 206, 208, and 210 can be referred to as being the hole schedule of the gas diffuser plate 200. For example, the gas diffuser plate 200 of the illustrated examples of FIGS. 2 and 3 each have a hole schedule as described in Table 1 below.

TABLE 1

Gas Diffuser Plate Hole Schedule

| Ring # | Radius of Ring | Number of Holes per Ring | Angle between holes | Hole Diameter |
|---|---|---|---|---|
| 1 | 6" | 8 | 360°/8 = 45° | 2" |
| 2 | 10" | 8 | 360°/8 = 45° | 2" |
| 3 | 13" | 8 | 360°/8 = 45° | 2" |
| 4 | 16" | 16 | 360°/16 = 22.5° | 2" |
| 5 | 20" | 24 | 360°/24 = 15° | 2" |

The holes can have any suitable diameter, and the diameter of any one hole can be the same or different as the diameter of any other hole, although preferably the holes all have the same diameter.

The holes 202, 204, 206, 208, and 210 can also each have an orientation angle with respect to the vertical center line C, illustrated in FIG. 3, which can be selected to provide a desired distribution of the gas mixture feed stream 110 in the vessel. It should be noted that the use of the term "vertical" herein is for illustrative purposes only, to provide reference to the orientation of the components as illustrated, although in practice the components could be oriented in a different manner.

In one example, the orientation angle of each of the holes 202, 204, 206, 208, and 210 is about 0° with respect to the vertical center line C, meaning that all of the holes have a vertical orientation through the gas diffuser plate 200. In another example, as illustrated in FIG. 3, the holes 202 of the first ring can have a first orientation angle D, the holes 204 of the second ring can have a second orientation angle E, the holes 206 of the third ring can have a third orientation angle F, the holes 208 of the fourth ring can have a fourth orientation angle G, and the holes 210 of the fifth ring can have a fifth orientation angle H. Orientation angles D, E, F, G and H can be the same or different. In one example, orientation angle D can be about 0°, orientation angle E can be about 35°, orientation angle F can be about 30°, orientation angle G can be about 30°, and orientation angle H can be about 45°.

In some examples, a gas distributor of the present technology can include a sidewall in addition to a gas diffuser plate 200. FIG. 3 illustrates one such example of a gas distributor 300, which includes the circular gas diffuser plate 200 and a sidewall 302. The gas diffuser plate 200 as shown in FIG. 3 has a thickness 304 and a diameter 306. The gas distributor 300 also includes a gas distributor sidewall 308 connected to the gas diffuser plate 200 at the lower end 310 of the gas distributor sidewall 308. The upper end 312 of the of the gas distributor sidewall 308 can be attached to the gas inlet 114 in the vessel 102 of the of the ammonia oxidizer 100. In the illustrated example, the gas distributor sidewall 308 is shaped as a truncated cone, having a diameter at the lower end 310 that is equal to the diameter 306 of the gas diffuser plate 200, and an upper diameter 314 at the upper end 312 that is less than the diameter at the lower end 310. The gas distributor 300 also has a height 316.

In practice, the gas mixture feed stream 110 is provided into the vessel 102 by entering the gas distributor 300 at the upper end 312 of the gas distributor sidewall 308 and exiting the gas distributor 300 at the lower end 310 of the gas distributor sidewall 308 through the holes 202, 204, 206, 208, and 210 of the gas diffuser plate 200.

Example 1

A Computational Fluid Dynamic (CFD) computer model was used to evaluate Design 1 of a gas distributor of the present technology, which was designed in accordance with FIGS. 2 and 3. The height of the gas distributor was about 14 inches. The upper diameter of the gas distributor sidewall was about 23.25 inches, and the lower diameter of the gas distributor sidewall was about 44 inches. The diameter of the gas diffuser plate was also about 44 inches, and the gas diffuser plate had a thickness of about 1.575 inches. The gas diffuser plate had a hole schedule as described in Table 1 above. The orientation angles of the holes in the gas diffuser plate were varied as set forth in Table 2 below to determine the effects of the angles on distribution of the gas mixture feed stream in the vessel of the ammonia oxidizer.

TABLE 2

| Ring # | Case 2 | Case 3 | Case 4 | Case 5 | Case 6 | Case 7 | Case 8 | Case 9 | Case 10 | Case 11 | Case 12 | Case 13 |
|---|---|---|---|---|---|---|---|---|---|---|---|---|
| 1 | 0° | 0° | 0° | 0° | 0° | 0° | 0° | 0° | 0° | 0° | 0° | 0° |
| 2 | 30° | 30° | 30° | 30° | 30° | 20° | 20° | 25° | 25° | 35° | 40° | 35° |
| 3 | 30° | 30° | 35° | 33° | 30° | 24° | 24° | 35° | 35° | 25° | 30° | 30° |
| 4 | 30° | 30° | 40° | 35° | 33° | 29° | 24° | 30° | 25° | 25° | 30° | 30° |
| 5 | 30° | 45° | 50° | 47° | 46° | 46° | 40° | 45° | 40° | 40° | 45° | 45° |

The results indicated that the orientation angles of holes in the gas diffuser plate have a significant impact on the gas flow distribution within the vessel and across the catalyst bed. The results for Case 13 were the best with respect to providing the most efficient gas distribution across the catalyst bed.

Example 2

Performance of the Design 1 gas distributor of the present technology as described in Example 1 above, having orientation angles in accordance with Case 13 in Example 1 above was compared to performance of a currently known gas distributor having a triangular gas diffuser plate, and no sidewall, at the gas inlet of the ammonia oxidizer. The triangular gas diffuser plate had 45 holes, each hole having a diameter of about 1 inch.

Quantitative comparisons of the two distributors are shown in Table 3 below, where mass percentage of gas through catalyst bed vs. inlet total, area weighted average gas velocity, and standard deviation of velocity magnitude are given side by side.

TABLE 3

|  | Design 1 | Triangular Plate |
|---|---|---|
| Normal rate: 86229 lb/hr | | |
| Mass % of Gas through Cat. Bed vs Inlet Total | 100% | 100% |
| Area Weighted Average Gas Velocity at Catalyst Bed (m/s) | 2.42 | 2.41 |
| Stand. Deviation of Gas Velocity | 1.37 | 2.02 |
| Minimum rate: 43100 lb/hr | | |
| Mass % of Gas through Cat. Bed vs Inlet Total | 100% | 100% |
| Area Weighted Average Gas Velocity at Catalyst Bed (m/s) | 1.93 | 1.92 |
| Stand. Deviation of Gas Velocity | 1.12 | 1.6 |
| Max rate: 112031 lb/hr | | |
| Mass % of Gas through Cat. Bed vs Inlet Total | 100% | 100% |
| Area Weighted Average Gas Velocity at Catalyst Bed (m/s) | 2.57 | 2.55 |
| Stand. Deviation of Gas Velocity | 1.49 | 2.15 |

The pressure drop across the Design 1 and Triangular Plate gas diffusers was also determined, and is set forth in Table 4 below for an operating pressure of about 12 psig. The pressure drop across the distributor for Design 1 gas distributor is larger than the pressure drop across the Triangular Plate gas diffuser. Without being bound by any particular theory, it is believed that this is due to the sidewall of the Example 1 gas distributor. However, the pressure drop across the Design 1 gas distributor at the operating pressure of about 12 psig and a normal gas feed rate (4600 Pa/0.667 psi) was only 5.5% of the operating pressure, which is not deemed to be a significant amount.

TABLE 4

| | | | Pressure Drop | | |
|---|---|---|---|---|---|
| Gas Feed Rate | | lb/hr | Minimum 43100 | Normal 86229 | Maximum 112031 |
| Pressure Drop | Design 1 | Pa | 2100 (0.304 psi) | 4600 (0.667 psi) | 6800 (0.986 psi) |
| | Triangular Plate | Pa | 480 (0.070 psi) | 1100 (0.160 psi) | 1650 (0.239 psi) |

Example 3

The effect of having a distribution ring attached to the inner wall of the vessel of an ammonia oxidizer was tested for an ammonia oxidizer having a currently known gas distributor having a triangular gas diffuser plate, and no sidewall, at the gas inlet of the ammonia oxidizer. The triangular gas diffuser plate had 45 holes, each hole having a diameter of about 1 inch. The distribution ring had a width of about 3 inches and was located about 45 inches below the gas distributor.

Quantitative comparisons of the two ammonia oxidizers are shown in Table 5 below, where area weighted average gas velocity, and standard deviation of velocity magnitude are given side by side.

TABLE 5

| Normal rate: 86229 lb/hr | Triangular Plate | Triangular Plate plus 3" Distribution Ring |
|---|---|---|
| Area Weighted Average Gas Velocity at Catalyst Bed (m/s) | 2.41 | 2.41 |
| Stand. Deviation of Gas Velocity at Catalyst Bed | 2.02 | 1.63 |

Based on the quantitative comparison, the addition of the distribution ring reduced the standard deviation of the gas velocity at the catalyst bed to 1.63 from 2.02, which is a 19% improvement of gas distribution uniformity.

Example 4

A Computational Fluid Dynamic (CFD) computer model was used to evaluate examples of an alternative design of a gas distributor of the present technology in combination with distribution rings of the present technology. The gas distributor was designed in accordance with FIG. 2. The model included an ammonia oxidizer with a vessel having a diameter of about 120 inches, and a catalyst bed having a diameter of about 108 inches and a depth of about 4 inches. The gas distributor included a thin circular gas diffuser plate having a thickness of about 0.25 inches, and no gas distributor sidewall. The circular gas diffuser plate included vertical holes, drilled through the circular gas diffuser plate at an angle of 90° to the surface of the circular gas diffuser plate, each hole having a diameter of about 2 inches. The ammonia oxidizer was modeled as having distribution rings of four different widths, located in each example at about 45 inches below the gas distributor and the results are shown in Table 6.

TABLE 6

|  | Design 2<br>Circular plate<br>plus 3"<br>Distribution Ring | Design 3<br>Circular plate<br>plus 1.73"<br>Distribution Ring | Design 4<br>Circular plate<br>plus 1.3"<br>Distribution Ring | Design 5<br>Circular plate<br>plus 0.87"<br>Distribution Ring |
|---|---|---|---|---|
| Normal rate: 86229 lb/hr |  |  |  |  |
| Area Weighted Average Gas Velocity at Catalyst Bed (m/s) | 2.43 | 2.43 | 2.42 | 2.42 |
| Stand. Deviation of Gas Velocity at Catalyst Bed | 2.23 | 1.24 | 1.43 | 1.94 |

Designs 3 through 5 in Table 6 showed the best results for standard deviation of gas velocity at catalyst bed, each being less than the standard velocity at catalyst bed of 2.02 that was exhibited by the Triangular Plate in Table 3 above. With Example 3 from the existing triangular plate in Hopewell NH3 oxidizer. Therefore, 39% improvement of gas distribution uniformity is achieved by installing the new design of Simplified Design #2.

The Example 4 showed less pressure drop cross the gas diffuser than the Example 1, which, without being bound by any particular theory, is believed to be due to the removal of the distributor sidewall. At normal flow rate, the pressure drop for the Example 4 is about 0.16 psi or 1.3% of an operating pressure of 12 psi, compared with the pressure drop of 0.667 psi or 5.5% of an operating pressure of 12 psi that resulted with the Example 1.

From the foregoing, it will be appreciated that although specific examples have been described herein for purposes of illustration, various modifications may be made without deviating from the spirit or scope of this disclosure. It is therefore intended that the foregoing detailed description be regarded as illustrative rather than limiting, and that it be understood that it is the following claims, including all equivalents, that are intended to particularly point out and distinctly claim the claimed subject matter.

What is claimed is:

1. An ammonia oxidizer comprising:
a vessel having an inner wall;
a catalyst bed contained within the vessel;
a gas inlet in the vessel; and
a gas distributor installed in the gas inlet, the gas distributor comprising a circular gas diffuser plate having a thickness and a center point, and a plurality of holes arranged in a series of concentric rings, each ring having a center at the center point of the gas diffuser plate;
the gas diffuser plate including at least an inner ring, an intermediate ring, and an outer ring each having a different plurality of holes; and
the holes of the inner ring having a first orientation angle, and the holes of at least one of the intermediate ring and the outer ring having a second orientation angle greater than the first orientation angle.

2. The ammonia oxidizer of claim 1, wherein the plurality of holes of the inner ring have an orientation angle of about 0° with respect to a vertical centerline of the gas distributor.

3. The ammonia oxidizer of claim 1, wherein the inner ring has a first plurality of holes, the intermediate ring has a second plurality of holes greater than the first plurality, and the outer ring has a third plurality of holes greater than the second plurality.

4. The ammonia oxidizer of claim 1, wherein the holes of the inner ring have a first orientation angle, the holes of the intermediate ring have a second orientation angle greater than the first orientation angle, and the holes of the outer ring have a third orientation angle greater than the second orientation angle.

5. The ammonia oxidizer of claim 1, further comprising a distribution ring attached to the inner wall of the vessel at a predetermined location below the gas distributor, the distribution ring having a width.

6. The ammonia oxidizer of claim 5, wherein the distribution ring has a width of up to about 5 inches.

7. The ammonia oxidizer of claim 5, wherein the distribution ring has a width from about 1 inch to about 4 inches.

8. The ammonia oxidizer of claim 1, wherein the gas distributor further comprises:
a gas distributor sidewall connected to the gas diffuser plate at a lower end of the gas distributor sidewall, and connected to the gas inlet of the vessel at an upper end of the gas distributor sidewall.

9. The ammonia oxidizer of claim 8, wherein the gas distributor sidewall has an upper diameter at the upper end that is less than a diameter of the gas distributor sidewall at the lower end.

10. An ammonia oxidizer comprising:
a vessel having an inner wall;
a catalyst bed contained within the vessel;
a gas inlet in the vessel;
a gas distributor installed in the gas inlet, the gas distributor comprising a circular gas diffuser plate having a thickness and a center point, and a plurality of holes arranged in a series of concentric rings, each ring having a center at the center point of the gas diffuser plate;
the gas diffuser plate including at least an inner ring, an intermediate ring, and an outer ring, the inner ring and at least one of the intermediate ring and the outer ring having a different plurality of holes; and
the holes of the inner ring having a first orientation angle, and the holes of at least one of the intermediate ring and the outer ring having a second orientation angle greater than the first orientation angle; and
a distribution ring attached to the inner wall of the vessel at a predetermined location below the gas distributor, the distribution ring having a width.

11. The ammonia oxidizer of claim 10, wherein the plurality of holes of the inner ring have an orientation angle of about 0° with respect to a vertical centerline of the gas distributor.

12. The ammonia oxidizer of claim 10, wherein the inner ring has a first plurality of holes, the intermediate ring has a second plurality of holes greater than the first plurality, and the outer ring has a third plurality of holes greater than the second plurality.

13. The ammonia oxidizer of claim 10, wherein the holes of the inner ring have a first orientation angle, the holes of the intermediate ring have a second orientation angle greater than the first orientation angle, and the holes of the outer ring have a third orientation angle greater than the second orientation angle.

14. The ammonia oxidizer of claim 10, wherein the distribution ring has a width of up to about 5 inches.

15. The ammonia oxidizer of claim 10, wherein the distribution ring has a width from about 1 inch to about 4 inches.

16. The ammonia oxidizer of claim 10, wherein the gas distributor further comprises:

a gas distributor sidewall connected to the gas diffuser plate at a lower end of the gas distributor sidewall, and connected to the gas inlet of the vessel at an upper end of the gas distributor sidewall.

17. The ammonia oxidizer of claim 16, wherein the gas distributor sidewall has an upper diameter at the upper end that is less than a diameter of the gas distributor sidewall at the lower end.

18. An ammonia oxidizer comprising:

a vessel having an inner wall;

a catalyst bed contained within the vessel;

a gas inlet in the vessel;

a gas distributor installed in the gas inlet, the gas distributor comprising a circular gas diffuser plate having a thickness and a center point, a plurality of holes arranged in a series of concentric rings, each ring having a center at the center point of the gas diffuser plate;

the gas diffuser plate including at least an inner ring, an intermediate ring, and an outer ring, the inner ring and at least one of the intermediate ring and the outer ring having a different plurality of holes; and the holes of the inner ring having a first orientation angle, and the holes of at least one of the intermediate ring and the outer ring having a second orientation angle greater than the first orientation angle; and a gas distributor sidewall connected to the gas diffuser plate at a lower end of the gas distributor sidewall and connected to the gas inlet of the vessel at an upper end of the gas distributor sidewall.

19. The ammonia oxidizer of claim 18, wherein the inner ring has a first plurality of holes, the intermediate ring has a second plurality of holes greater than the first plurality, and the outer ring has a third plurality of holes greater than the second plurality.

20. The ammonia oxidizer of claim 18, wherein the holes of the inner ring have a first orientation angle, the holes of the intermediate ring have a second orientation angle greater than the first orientation angle, and the holes of the outer ring have a third orientation angle greater than the second orientation angle.

\* \* \* \* \*